US011384211B2

(12) United States Patent
Eto et al.

(10) Patent No.: US 11,384,211 B2
(45) Date of Patent: Jul. 12, 2022

(54) IN-SITU POLYMERIZED TYPE THERMOPLASTIC PREPREG, THERMOPLASTIC COMPOSITE, AND METHODS OF MANUFACTURING THE SAME

(71) Applicant: NIPPON STEEL Chemical & Material Co., Ltd., Tokyo (JP)

(72) Inventors: Kazuya Eto, Tokyo (JP); Yuki Nobuzawa, Tokyo (JP); Isao Kurata, Tokyo (JP); Shinkichi Murakami, Tokyo (JP)

(73) Assignee: NIPPON STEEL CHEMICAL & MATERIAL CO., LTD., Tokyo (JP)

( * ) Notice: Subject to any disclaimer, the term of this patent is extended or adjusted under 35 U.S.C. 154(b) by 0 days.

(21) Appl. No.: 17/182,403

(22) Filed: Feb. 23, 2021

(65) Prior Publication Data
US 2021/0171729 A1    Jun. 10, 2021

Related U.S. Application Data

(62) Division of application No. 15/780,048, filed as application No. PCT/JP2016/085083 on Nov. 18, 2016, now Pat. No. 10,961,363.

(30) Foreign Application Priority Data

Dec. 1, 2015  (JP) .................................. 2015-235221

(51) Int. Cl.
| | |
|---|---|
| *C08J 5/24* | (2006.01) |
| *C08L 63/00* | (2006.01) |
| *C08L 71/00* | (2006.01) |
| *B32B 27/38* | (2006.01) |
| *B29C 70/06* | (2006.01) |
| *B01J 31/02* | (2006.01) |
| *C08J 5/04* | (2006.01) |
| *B32B 27/28* | (2006.01) |
| *C08G 59/28* | (2006.01) |
| *C08G 59/30* | (2006.01) |
| *C08G 59/68* | (2006.01) |

(52) U.S. Cl.
CPC ............. *C08J 5/24* (2013.01); *B01J 31/0244* (2013.01); *B29C 70/06* (2013.01); *B32B 27/38* (2013.01); *C08J 5/042* (2013.01); *C08L 63/00* (2013.01); *C08L 71/00* (2013.01); *B32B 27/285* (2013.01); *C08G 59/28* (2013.01); *C08G 59/302* (2013.01); *C08G 59/688* (2013.01); *C08J 2300/22* (2013.01); *C08J 2363/00* (2013.01)

(58) Field of Classification Search
CPC .. C08J 5/24; C08L 63/00; C08L 71/00; B32B 27/285; B32B 27/38
USPC ............................................... 428/297.4, 413
See application file for complete search history.

(56) References Cited

U.S. PATENT DOCUMENTS

| | | | | |
|---|---|---|---|---|
| 4,661,559 A * | 4/1987 | Gardner | ................. | C08G 59/50 525/107 |
| 5,206,289 A | 4/1993 | Sinsky et al. | | |
| 2014/0228519 A1 | 8/2014 | Nakayama et al. | | |
| 2014/0299253 A1* | 10/2014 | Minamida | ............... | B32B 41/00 156/64 |

FOREIGN PATENT DOCUMENTS

| | | |
|---|---|---|
| JP | 2001501248 A | 1/2001 |
| JP | 2005238758 A | 9/2005 |
| JP | 2006321896 A | 11/2006 |
| JP | 2006321897 A | 11/2006 |
| WO | 9814498 A1 | 4/1998 |
| WO | 2004060981 A1 | 7/2004 |
| WO | 2008010823 A2 | 1/2008 |
| WO | 2010079832 A1 | 7/2010 |
| WO | 2015105051 A1 | 7/2015 |
| WO | 2016143524 A1 | 9/2016 |

OTHER PUBLICATIONS

Int'l Search Report and Written Opinion dated Dec. 20, 2016 in Int'l Application No. PCT/JP2016/085083.
Office Action dated Jul. 10, 2020 in U.S. Appl. No. 15/780,048 by ETO.

* cited by examiner

*Primary Examiner* — Michael J Feely
(74) *Attorney, Agent, or Firm* — Panitch Schwarze Belisario & Nadel LLP

(57) ABSTRACT

An in-situ polymerized type thermoplastic prepreg is provided, which is excellent in productivity, has tack properties and drape properties that allow easy shaping in a mold, is excellent in handling properties, and allows a molded product obtained by curing to have both mechanical properties as high as those of a thermosetting composite and the features of the thermoplastic composite. An in-situ polymerized type thermoplastic prepreg 1 includes reinforcing fibers 2 and an in-situ polymerized type thermoplastic epoxy resin 3 as a matrix resin. The in-situ polymerized type thermoplastic epoxy resin 3 is cured to B-stage, with the weight-average molecular weight being 6,000 or less, and has tack properties and drape properties at 30° C. or less, and the in-situ polymerized type thermoplastic epoxy resin after curing has a weight-average molecular weight of 30,000 or more.

7 Claims, 5 Drawing Sheets

(PREPARATION OF RESIN)

(APPLICATION OF RESIN)

(PREPARATION OF RESIN FILM)

(CURING OF RESIN FILM)

(RESIN IMPREGNATION)

(RESIN IMPREGNATION)

(COATING WITH PROTECTIVE FILM)

(PREPARATION OF RESIN)

(CURING OF RESIN)

(APPLICATION OF RESIN)

(PREPARATION OF RESIN FILM)

(COATING WITH PROTECTIVE FILM)

IN-SITU POLYMERIZED TYPE THERMOPLASTIC PREPREG, THERMOPLASTIC COMPOSITE, AND METHODS OF MANUFACTURING THE SAME

CROSS-REFERENCE TO RELATED APPLICATIONS

This application is a Divisional of U.S. patent application Ser. No. 15/780,048, filed May 30, 2018, which is a Section 371 of International Application No. PCT/JP2016/08083, filed Nov. 18, 2016, which was published in the Japanese language on Jun. 8, 2017, under International Publication No. WO 2017/094633 A1, which claims priority under 35 U.S.C. § 119(b) to Japanese Application No. 2015-235221, filed Dec. 1, 2015, the disclosures of which are incorporated herein by reference in their entirety.

TECHNICAL FIELD

The present invention relates to a fiber-reinforced composite material having reinforcing fibers and a matrix resin and, more particularly, to a thermoplastic prepreg and a thermoplastic composite each having an in-situ polymerized type thermoplastic epoxy resin as a matrix resin and methods of manufacturing the same. In particular, such in-situ polymerized type thermoplastic prepreg and thermoplastic composite are suitably used for the manufacture of sporting good materials and general industrial materials and also for the manufacture of automotive members and aerospace members.

BACKGROUND ART

A sheet-like fiber-reinforced thermoplastic resin complex obtained by impregnating a thermoplastic resin into a continuous reinforcing fiber bundle is generally called a thermoplastic prepreg, which is widely used as a molding base material, for example, golf clubs and other sporting equipment and leisure goods as well as automotive and aircraft members and general industrial materials.

A molded product obtained by molding the above prepreg, i.e., a fiber-reinforced composite material (composite) is required to have high surface appearance quality and mechanical properties. It is therefore necessary to minimize voids by sufficiently impregnating a resin into a reinforcing fiber bundle. When, however, using a general thermoplastic resin as a matrix resin, it is very difficult to sufficiently impregnating the resin into the reinforcing fiber bundle at the time of composite molding because the melt viscosity of the resin is high. For this reason, attempts have been made to develop a so-called completely impregnated type thermoplastic prepreg, with a thermoplastic resin being almost completely impregnated into a reinforcing fiber bundle in a prepreg state.

In this case, "completely impregnated" indicates a state in which the thermoplastic resin is infiltrated between the single fibers of the reinforcing fiber bundle substantially without any gaps.

A completely impregnated type thermoplastic prepreg using a general thermoplastic resin can reduce voids in a molded product. On the other hand, the prepreg itself is rigid and hence is poor in handling properties (to be referred to as "drape properties" hereinafter) when being shaped along a mold having a complex shape at the time of molding. This imposes great limitations on the degree of freedom of the shape of an end product. In addition, when using a general thermoplastic resin as a matrix resin, it provides an advantage in terms of storage stability because an obtained prepreg has undergone matrix resin polymerization. On the other hand, since a prepreg has no adhesive properties (to be referred to as "tack properties" hereinafter), interlamination displacement tends to occur at the time of a lamination process using such prepregs, thus posing a problem in workability.

In addition, in order to sufficiently impregnate a general thermoplastic resin into a reinforcing fiber bundle, it is necessary to forcibly impregnate the molten resin into the reinforcing fiber bundle by applying a high temperature and pressure. This causes the high-viscosity resin to flow so as to disturb the reinforcing fiber bundle, resulting in damage to the quality and mechanical properties of the obtained molded product.

In this case, general thermoplastic resins include polyamides (nylon 6, nylon 66, and the like), polyolefins (polyethylene, polypropylene, and the like), modified polyolefin, polyesters (polyethylene terephthalate, polybutylene terephthalate, and the like), polycarbonate, polyamideimide, polyphenylene oxide, polysulfone, polyether sulfone, polyether ether ketone, polyether imide, polystyrene, ABS, polyphenylene sulfide, liquid crystal polyester, copolymer of acrylonitrile and styrene, and mixtures of them.

Under the circumstance, recently, prepregs in a commingled form and discontinuously commingled form have been developed to solve problems associated with such drape properties, internal voids, mechanical properties, and surface appearance quality.

In this case, the "commingled form" indicates a composite form in which a continuous thermoplastic resin is made to exist in a fiber form inside a continuous reinforcing fiber bundle. In addition, the "discontinuously commingled form" indicates a composite form in which a discontinuous thermoplastic resin is made to exist in a fiber form inside a continuous reinforcing fiber bundle.

For example, patent literature 1 discloses a method of manufacturing a prepreg in a commingled form which is constituted by a continuous reinforcing fiber bundle and a continuous thermoplastic resin fiber bundle. This form is excellent in drape properties because the thermoplastic resin is not impregnated in a prepreg state, and has good impregnability because the reinforcing fiber bundle and the thermoplastic resin are arranged close to each other. However, when a prepreg is transferred or shaped in a mold, the reinforcing fiber bundle and the thermoplastic resin fiber bundle are divided and separated, or it is necessary to perform a process of spinning the thermoplastic resin into a multifilament resin in advance. This makes this form unsuitable for industrial uses in terms of productivity and handling properties.

In addition, patent literature 2 discloses a method of manufacturing a prepreg in a discontinuously commingled form by placing, on a continuous reinforcing fiber bundle, a sheet on which discontinuous thermoplastic resin fibers cut in lengths of 20 mm to 200 mm are randomly oriented, and forcibly interlacing the fibers using an interlacing method such as a water jet method. This form is also good in impregnability at the time of molding. In addition, the form is held in a completely interlaced state, and hence is free from the problem that the reinforcing fiber bundle is separated from the thermoplastic resin fibers. However, since the thermoplastic resin fibers are arranged in a short fiber state, the prepreg becomes bulky. As a result, for example, the prepreg cannot be shaped in a mold depending on its shape, posing problems in terms of drape properties. Furthermore, using a forcible interlacing method such as a water jet method will break or bend reinforcing fibers, thus posing problems such as deteriorations in the surface appearance quality and mechanical properties of a molded product. Moreover, it is necessary to separately perform a process of spinning the thermoplastic resin into a multifilament resin in advance and a process of cutting the multifilament resin into short fibers using a cutter or the like. This makes this form unsuitable for industrial uses in terms of productivity as in the case of the commingled form.

In addition, patent literature 3 discloses a method of manufacturing a prepreg in a discontinuously commingled form by, while discharging a thermoplastic resin in a heated molten state, making the nonwoven thermoplastic resin adhere onto a continuous reinforcing fiber bundle using an air blower for blowing compressed air from near the discharge port of the thermoplastic resin. This method is designed to continuously make a thermoplastic resin adhere to a reinforcing fiber bundle while heating and melting the resin, and hence is superior in productivity to the manufacturing method disclosed in patent literature 2. However, as in patent literatures 1 and 2, a prepreg handled in the method is not a prepreg in which a thermoplastic resin is completely impregnated, when molding is performed using the prepreg, voids occur in the molded product or its appearance quality deteriorates. That is, the above problems are still unsolved.

Furthermore, in either of patent literatures 1 to 3, a prepreg itself has no tack properties, and hence exhibits poor lamination workability. In actuality, therefore, these techniques are unsuitable for industrial uses.

Moreover, since a general thermoplastic resin is used as a matrix, the interface strength between reinforcing fibers and the resin is low. This makes it necessary to excessively increase the thickness of the composite in order to obtain industrially sufficient physical properties. That is, these techniques have not yet solved the problem that the innate features of a composite, i.e., high specific strength and specific rigidity, cannot be exploited.

As described above, there have not been found any thermoplastic prepregs or any thermoplastic composites which use general thermoplastic resins and satisfy requirements for impregnability, drape properties, handling properties, productivity, and mechanical properties at high levels.

Under the circumstances, there has been proposed a method of molding a thermoplastic composite by impregnating an in-situ polymerized type thermoplastic resin as an uncured thermoplastic resin into a reinforcing fiber bundle and then heating and curing the resin.

For example, patent literature 4 discloses a method of molding a thermoplastic composite obtained by impregnating an in-situ polymerized type thermoplastic epoxy resin in an uncured state into a reinforcing fiber bundle and then heating and curing the resin. According to the method disclosed in patent literature 4, since the resin is heated and cured after being sufficiently impregnated into the reinforcing fiber bundle, inner voids are difficult to occur in the molded product, and the adhesive properties at the interfaces between the reinforcing fibers and the resin are good. For this reason, the molded product has excellent mechanical properties. There is also disclosed a method of molding a thermoplastic composite by preparing a prepregs each having an unreacted resin impregnated into a reinforcing fiber bundle, laminating the prepregs, and heating and curing the resultant structure.

PRIOR ART DOCUMENT

Patent Literature

[Patent Literature 1]
Japanese Patent Laid-Open No. 60-209033
[Patent Literature 2]
Japanese Patent Laid-Open No. 3-47713
[Patent Literature 3]
Japanese Patent No. 4292994
[Patent Literature 4]
Japanese Patent No. 4708797

SUMMARY OF THE INVENTION

Problems to be Solved by the Invention

Patent literature 4, however, discloses only a method of preparing a prepreg by a so-called "wet method" of adding a solvent to a resin to reduce its viscosity so as to sufficiently impregnate the resin into a reinforcing fiber bundle. In addition, in patent literature 4, the matrix resin of the prepreg is only defined as a resin in an unreacted state, and the prepreg is not a prepreg suitable for industrial uses in consideration of tack properties and drape properties but is only a prepreg as a reinforcing fiber base material into which an unreacted resin is simply impregnated.

In addition, for example, prepregs obtained by a wet method like that disclosed in patent literature 4 are subjected to variations in the amount of solvent left because of a difficulty in controlling the amount of solvent left in the prepregs. This leads to the instability of the quality of molded products, for example, the occurrence of voids due to the volatilization of the residual solvent at the time of molding and variations in mechanical properties.

As described above, even with the use of in-situ polymerized type thermoplastic resins, there have not been found any thermoplastic prepregs which satisfy requirements for workability, productivity, and mechanical properties at high levels.

The present inventors have found that the above problems can be collectively solved by an in-situ polymerized type thermoplastic prepreg prepared by a manufacturing method to be described later using an in-situ polymerized type thermoplastic epoxy region as a matrix resin.

The present invention is based on novel findings made by the present inventors.

It is an object of the present invention to provide an in-situ polymerized type thermoplastic prepreg which is excellent in productivity, has tack properties and drape properties that allow easy shaping in a mold, is excellent in handling properties, and allows a molded product obtained by curing to have both mechanical properties as high as those of a thermosetting composite and the features of a thermoplastic composite.

It is another object of the present invention to provide a thermoplastic composite which is prepared by curing the above in-situ polymerized type thermoplastic prepreg and has both mechanical properties as high as those of a thermosetting composite and the features of a thermoplastic composite and methods of manufacturing an in-situ polymerized type thermoplastic prepreg and a thermoplastic composite.

Means for Solving the Problems

The objects of the present invention are achieved by an in-situ polymerized type thermoplastic prepreg, a thermoplastic composite, and methods of manufacturing the same. In summary, the first invention is an in-situ polymerized type thermoplastic prepreg comprising reinforcing fibers and an in-situ polymerized type thermoplastic epoxy resin as a matrix resin, characterized in that the in-situ polymerized type thermoplastic epoxy resin is cured to B-stage, with a weight-average molecular weight being not more than 6,000, and has tack properties and drape properties at not more than 30° C., and the in-situ polymerized type thermoplastic epoxy resin after curing has a weight-average molecular weight of not less than 30,000 and exhibits thermoplasticity.

According to an embodiment of the first invention, the uncured in-situ polymerized type thermoplastic epoxy resin comprises (a) a first bifunctional compound having two epoxy groups, and (b) a second bifunctional compound having two functional groups of at least one type selected from the group consisting of a phenolic hydroxyl group, an amino group, a carboxyl group, a mercapto group, an isocyanate group, and a cyanate ester group.

According to another embodiment of the first invention, the in-situ polymerized type thermoplastic epoxy resin has a resin content ratio of 20 wt % to 40 wt %.

According to another embodiment of the first invention, the reinforcing fibers have a weight per unit area of 50 g/m² to 500 g/m².

According to another embodiment of the first invention, the reinforcing fibers have a tensile modulus of more than 40 GPa and are unidirectional continuous fibers paralleled in one direction.

The second invention is a thermoplastic composite obtained by curing an in-situ polymerized type thermoplastic prepreg with the above arrangement, characterized in that the cured in-situ polymerized type thermoplastic epoxy resin has a weight-average molecular weight of not less than 30,000 and exhibits thermoplasticity.

The third invention is a method of manufacturing an in-situ polymerized type thermoplastic prepreg comprising reinforcing fibers and an in-situ polymerized type thermoplastic epoxy resin as a matrix resin, characterized by comprising:

(a) preparing an in-situ polymerized type thermoplastic epoxy resin comprising a first bifunctional compound having two epoxy groups, a second bifunctional compound having two functional groups of at least one type selected from the group consisting of a phenolic hydroxyl group, an amino group, a carboxyl group, a mercapto group, an isocyanate group, and a cyanate ester group, and a catalyst;

(b) preparing a resin film by uniformly applying the prepared in-situ polymerized type thermoplastic epoxy resin onto a release sheet while adjusting a temperature of the resin within a range of 40° C. to 70° C.;

(c) performing a polymerization reaction to cure the resin film on the release sheet to B-stage, with a weight-average molecular weight of the in-situ polymerized type thermoplastic epoxy resin being not more than 6,000, while maintaining a temperature of the resin film at 20° C. to 40° C. for 50 hr to 240 hr; and (d) impregnating the in-situ polymerized type thermoplastic epoxy resin in B-stage as a matrix resin into reinforcing fibers.

The fourth invention is a method of manufacturing an in-situ polymerized type thermoplastic prepreg comprising reinforcing fibers and an in-situ polymerized type thermoplastic epoxy resin as a matrix resin, characterized by comprising:

(a) preparing an in-situ polymerized type thermoplastic epoxy resin comprising a first bifunctional compound having two epoxy groups, a second bifunctional compound having two functional groups of at least one type selected from the group consisting of a phenolic hydroxyl group, an amino group, a carboxyl group, a mercapto group, an isocyanate group, and a cyanate ester group, and a catalyst;

(b) performing a polymerization reaction to cure the prepared in-situ polymerized type thermoplastic epoxy resin to B-stage, with a weight-average molecular weight of the in-situ polymerized type thermoplastic epoxy resin being not more than 6,000, while maintaining a temperature of the in-situ polymerized type thermoplastic epoxy resin at 20° C. to 40° C. for 50 hr to 240 hr;

(c) preparing a resin film by uniformly applying the in-situ polymerized type thermoplastic epoxy resin polymerized to B-stage onto a release sheet while adjusting a temperature of the resin within a range of 40° C. to 80° C.; and (d) impregnating the in-situ polymerized type thermoplastic epoxy resin in B-stage as a matrix resin into reinforcing fibers.

According to an embodiment of the third and fourth inventions, the catalyst comprises imidazole-based catalysts including 1,2-alkylenebenzimidazole (TBZ) and 2-aryl-4.5-diphenylimidazole (NPZ), aliphatic polyamine-based catalysts including diethylene triamine and menthane diamine, aromatic amine-based catalysts including diaminodiphenyl sulfone, and phosphorus-based catalysts.

According to another embodiment of the third and fourth inventions, the in-situ polymerized type thermoplastic epoxy resin has a viscosity of 100 Pa·s to 1,000 Pa·s at 25° C. before polymerization.

According to another embodiment of the third and fourth inventions, the in-situ polymerized type thermoplastic epoxy resin has a resin content ratio of 20 wt % to 40 wt %.

According to another embodiment of the third and fourth inventions, the reinforcing fibers have a weight per unit area of 50 g/m² to 500 g/m².

According to another embodiment of the third and fourth inventions, the reinforcing fibers comprise uni-directional continuous fibers having a tensile modulus of not less than 40 GPa and paralleled in one direction.

The fifth invention is a method of manufacturing a thermoplastic composite, characterized by comprising laminating a plurality of in-situ polymerized type thermoplastic prepregs prepared by a method of manufacturing an in-situ polymerized type thermoplastic prepreg with the above arrangement, and then heating and curing the prepregs until the in-situ polymerized type thermoplastic epoxy resin has a weight-average molecular weight of not less than 30,000.

According to an embodiment of the fifth invention, a laminated body of the in-situ polymerized type thermoplastic prepregs is heated at a temperature of 100° C. to 200° C. and a pressure of 1 atm to 10 atm.

According to another embodiment of the fifth invention, the in-situ polymerized type thermoplastic epoxy resin after being heated/cured and polymerized has a glass-transition point of 90° C. to 150° C. and a melting point of 130° C. to 200° C.

Effects of the Invention

An in-situ polymerized type thermoplastic prepreg according to the present invention is excellent in productivity, has tack properties and drape properties that allow easy shaping in a mold, is excellent in handling properties, and allows a molded product obtained by curing to have both mechanical properties as high as those of a thermosetting composite and the features of the thermoplastic composite. A thermoplastic composite according to the present invention is prepared by curing the above in-situ polymerized type thermoplastic prepreg and has both mechanical properties as high as those of a thermosetting composite and the features of the thermoplastic composite. Furthermore, methods of manufacturing an in-situ polymerized type thermoplastic prepreg and a thermoplastic composite according to the present invention can very efficiently manufacture an in-situ polymerized type thermoplastic prepreg and a thermoplastic composite.

EMBODIMENTS FOR CARRYING OUT THE INVENTION

An in-situ polymerized type thermoplastic prepreg, a thermoplastic composite, and methods of manufacturing the same according to the present invention will be described in more detail below.

Figure 1A:
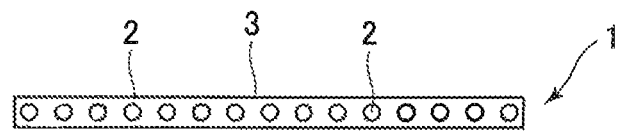
FIGS. 1(a) and 1(b) are schematic views showing an embodiment of an in-situ polymerized type thermoplastic prepreg and a thermoplastic composite according to the present invention.

Referring to FIG. 1(a), an in-situ polymerized type thermoplastic prepreg 1 according the present invention includes reinforcing fibers 2 and an in-situ polymerized type thermoplastic epoxy resin as a matrix resin 3. In the in-situ polymerized type thermoplastic prepreg 1 according to the present invention, the in-situ polymerized type thermoplastic epoxy resin 3 is cured to B-stage, with the weight-average molecular weight being 6,000 or less, and has tack properties and drape properties at 30° C. or less.

Although described in detail later, it was found from the results of many research experiments conducted by the present inventors that an in-situ polymerized type thermoplastic epoxy resin used in the present invention was softened to a predetermined viscosity at a temperature in the range of 10° C. to 70° C., and that when the softened resin was uniformly applied onto, for example, a release sheet in the form of a film, and was cured under curing conditions: at a temperature of 20° C. to 40° C. for 50 to 240 hr, the resin did not completely polymerize, and an in-situ polymerized type thermoplastic epoxy resin in so-called B-stage (semicured) was abled to be obtained.

In the present invention, the in-situ polymerized type thermoplastic epoxy resin 3 "cured to B-stage, with the weight-average molecular weight being 6,000 or less" in the in-situ polymerized type thermoplastic prepreg 1 means a semicured in-situ polymerized type thermoplastic epoxy resin. The in-situ polymerized type thermoplastic epoxy resin 3 "cured to B-stage, with the weight-average molecular weight being 6,000 or less" has flow properties and is excellent in impregnability with the reinforcing fibers 2.

The in-situ polymerized type thermoplastic prepreg 1 according to the present invention obtained by impregnating the in-situ polymerized type thermoplastic epoxy resin 3 "cured to B-stage, with the weight-average molecular weight being 6,000 or less" into the reinforcing fibers 2 can be stored for a long time at 25° C. or less, and preferably at −30° C. to 10° C., and has tack properties (adhesion) and drape properties (flexibility) at 30° C. or less when being used. This makes it possible to very easily laminate a plurality of prepregs.

If the weight-average molecular weight of the in-situ polymerized type thermoplastic epoxy resin in the in-situ polymerized type thermoplastic prepreg 1 exceeds 6,000, this poses problems that tack properties and drape properties are lost and that the workability becomes poor. On the other hand, the weight-average molecular weight of the in-situ polymerized type thermoplastic epoxy resin in Stage-B is 400 or more. When the weight-average molecular weight is less than 400, this poses a problem that the tack properties are excessively high. Therefore, the in-situ polymerized type thermoplastic epoxy resin in B-stage according to the present invention usually has a weight-average molecular weight of 400 to 6,000, and preferably 600 to 1,500.

Figure 1B:
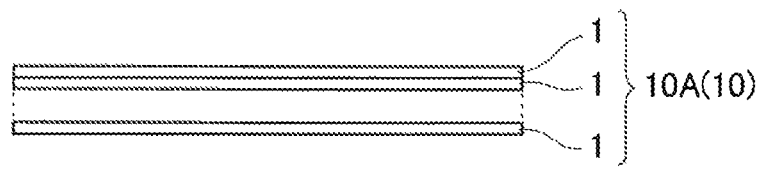

When preparing a thermoplastic composite 10 according to the present invention, as shown in FIG. 1(b), the in-situ polymerized type thermoplastic prepreg 1 stored under the above conditions is taken out, and a plurality of, for example, 5 to 20, in-situ polymerized type thermoplastic prepregs 1 are laminated after the temperature is restored to the working environment temperature. At this time, as described above, the in-situ polymerized type thermoplastic prepreg 1 according to the present invention has tack properties (adhesion) and drape properties (flexibility) required for a laminating operation, and exhibits very high workability. After the lamination operation, a laminated body 10A of the in-situ polymerized type thermoplastic prepregs 1 is heated and cured at a molding temperature of 100° to 200° C. and a molding pressure of 1 atm to 10 atm, thereby preparing the thermoplastic composite 10. In the thermoplastic composite 10 according to the present invention, the weight-average molecular weight of the cured in-situ polymerized type thermoplastic epoxy resin is set to 30,000 or more. Note that in the thermoplastic composite 10 according to the present invention, the heated/cured in-situ polymerized type thermoplastic epoxy resin after polymerization has a glass-transition point of 90° C. to 150° C. and a melting point of 130° C. to 200° C. and exhibits thermoplasticity. Therefore, when reheated at 100° C. to 200° C., the thermoplastic composite 10 is softened and capable of being shaped into a predetermined shape.

In this case, the in-situ polymerized type thermoplastic epoxy resin 3 is preferably obtained by polyaddition of a first bifunctional compound as a base compound and a second bifunctional compound. The first bifunctional compound has two epoxy groups. The second bifunctional compound has two functional groups of at least one type selected from the group consisting of a phenolic hydroxyl group, an amino group, a carboxyl group, a mercapto group, an isocyanate group, and a cyanate ester group.

Examples of the first bifunctional compound are: mononuclear aromatic diepoxy compounds each having one benzene ring such as catechol diglycidyl ether, resorcin diglycidyl ether, hydroquinone diglycidyl ether, t-butyl hydroquinone diglycidyl ether, 2,5-di-t-butyl hydroquinone diglycidyl ether, and phthalic acid diglycidyl ester; alicyclic diepoxy compounds such as Celloxide 2021P (commercial name, available from Daicel Chemical Industries Ltd.), limonene dioxide, and dicyclopentadiene dioxide; bisphenol epoxy compounds such as bis(4-hydroxyphenyl)methanediglycidylether, bis(4-hydroxyphenyl)ethanediglycidylether, and bis(4-hydroxyphenyl)propanediglycidylether, and partially condensed oligomer mixtures thereof (bisphenol type epoxy resins); substituted bisphenol epoxy compounds such as tetramethylbis(4-hydroxyphenyl)methanediglycidylether, tetramethylbis(4-hydroxyphenyl)ethanediglycidylether, tetramethylbis(4-hydroxyphenyl)propanediglycidylether, tetramethylbis(4-hydroxyphenyl)etherdiglycidylether, dimethyl-di-t-butyl bis(4-hydroxyphenyl)sulfidediglycidylether, and partially condensed oligomer mixtures thereof (substituted bisphenol type epoxy resins); other types of compounds such as bisphenol fluorene type epoxy resin, biscresolfluorene type epoxy resin, biphenyl type or tetramethylbiphenyl type epoxy resin, diglycidyl ether of dihydroxynaphthalene, and partially condensed oligomer mixtures thereof (naphthalene type epoxy resins); diepoxy compounds of cyclic fatty alcohols such as dimethylol cyclohexane diglycidyl ether, 1,4-cyclohexane diglycidyl ether, 1,3-cyclohexane diglycidyl ether, 1,2-cyclohexane diglycidyl ether, and dimethylol dicyclopentadiene diglycidyl ether; diepoxy compounds of cyclic fatty dicarboxylic acids such as hexahydro phthalate diglycidylester and hexahydro terephthalate diglycidylester; diepoxy compounds of fatty alcohols such as 1,4 butanediol diglycidylether and 1,6-hexanediol diglycidylether; and epoxy resins using dimer acids as skeletons such as Epikote 871 (commercial name, available from Japan Epoxy Resins Co., Ltd.) and Epikote 872 (commercial name, available from Japan Epoxy Resins Co., Ltd.). Among these compounds, bisphenol type epoxy resins such as bisphenol A-type epoxy resin and bisphenol F-type epoxy resin are preferred because they have low softening temperatures and hence exhibit good handling properties.

The second bifunctional compound to be reacted with such first bifunctional compound is a bifunctional compound having two functional groups of at least one type selected from the group consisting of a phenolic hydroxyl group, an amino group, a carboxyl group, a mercapto group, an isocyanate group, and a cyanate ester group. Among these compounds, a bifunctional compound having two phenolic hydroxyl groups is preferred. Examples of a bifunctional compound having two phenolic hydroxyl groups are: mononuclear aromatic dihydroxy compounds each having one benzene ring such as catechol; bisphenols such as bis(4-hydroxyphenyl)propane (bisphenol A), bis(4-hydroxyphenyl)methane (bisphenol F) and bis(4-hydroxyphenylethane (bisphenol AD); condensed polycyclic dihydroxy compounds such as dihydroxynaphthalene; and bifunctional phenol compounds each having an allyl group such as diallyl resorcin, diallyl bisphenol A, and triallyl dihydroxybiphenyl. Among these compounds, for example, a bisphenol such as bisphenol A or bisphenol F is preferably used, when the above bisphenol type epoxy resin is selected as the first bifunctional compound, because such a bisphenol has a low softening temperature and hence exhibits good handling properties.

In addition, a compound having a fluorene skeleton can be used for at least part of the first bifunctional compound and/or at least part of the second bifunctional compound. In this case, a high-temperature molten resin can be obtained by adjusting the melting temperature of the polymerized resin.

A compound, of the above first bifunctional compounds, which has a fluorene skeleton is, for example, a compound having a structure in which fluorene is substituted by a compound having one glycidyl group, such as a compound having one structure in which fluorene is substituted by two compounds each having a glycidyl group, which is represented by, for example, general formula (1):

[Chemical 1]

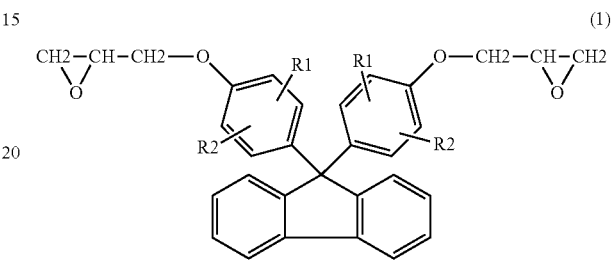

(1)

where R1 and R2 are identical or different C1-C5 saturated or unsaturated, linear or cyclic, hydrocarbon group which may have hydrogen atoms or substituent groups (for example, methyl, ethyl, t-butyl, or cyclohexyl) or aryl groups which may have substituent groups (for example, phenyl or tolyl). The substitution positions of R1 and R2 can be ortho or meta to glycidyl groups. Pluralities of R1s and R2s may be identical or different, respectively. In addition, the substitution positions of the pluralities of R1s and R2s may be the same or different. More specifically, such compounds include, for example, a bisphenol fluorene type epoxy resin, a biscresolfluorene type epoxy resin, a compound in which a plurality of R1s are hydrogen atoms and a plurality of R2s are phenyl groups, and a bis (diphenol) fluorene type epoxy resin. These compounds can be used singly or in combination of two or more of them. Among them, biscresol fluorene type epoxy resins are preferred.

Of the second bifunctional compounds, a compound having a fluorene skeleton includes a compound having a structure in which fluorene is substituted by a compound having a phenolic hydroxyl group, such as a compound having a structure in which fluorene is substituted by two compounds, each having one phenolic hydroxyl group. Such a compound can be represented by general formula (2):

[Chemical 2]

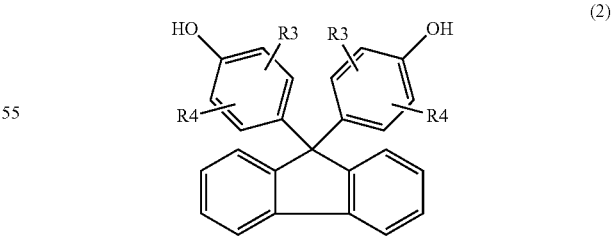

(2)

where R3 and R4 are identical or different C1-C5 saturated or unsaturated, linear or cyclic, hydrocarbon group which may have hydrogen atoms or substituent groups (for example, methyl, ethyl, t-butyl, or cyclohexyl) or aryl groups which may have substituent groups (for example, phenyl groups or tolyl groups). The substitution positions of R1 and R2 can be ortho or meta to glycidyl groups.

Pluralities of R3s and R4s may be identical or different, respectively. In addition, the substitution positions of the pluralities of R1s and R2s may be the same or different. More specifically, such compounds include, for example, bisphenols such as bisphenol fluorene and biscresol fluorene, and a compound in which a plurality of R3s are hydrogen atoms and a plurality of R4s are phenyl groups, and bis(phenylphenol) fluorene. These compounds can be used singly or in combination of two or more of them. Among them, biscresol fluorene is preferred.

In this case, in the in-situ polymerized type thermoplastic epoxy resin 3 according to the present invention, the mixing ratio of the second bifunctional compound to the first bifunctional compound is 50 to 70 parts by weight of the second bifunctional compound relative to 100 parts by weight of the first bifunctional compound. If the amount of the second bifunctional compound is less than 50 parts by weight or exceeds 70 parts by weight, it will interfere with an increase in molecular weight. The amount of the second bifunctional compound is preferably 55 to 65 parts by weight in terms of re-flow properties, heat resistance, mechanical properties, and the like.

The in-situ polymerized type thermoplastic epoxy resin 3 is obtained by reacting the first bifunctional compound with the second bifunctional compound described above. Such a reaction is preferably carried out in the presence of a polymerization catalyst to promote polymerization. When using, for example, a compound having two phenolic hydroxyl groups as the second bifunctional compound, examples of such a polymerization catalyst to be used include the following phosphorus-based catalysts, in addition to imidazole-based catalysts such as 1,2-alkylenebenzimidazole (TBZ) and 2-aryl-4,5-diphenylimidazole (NPZ), aliphatic polyamine-based catalysts such as diethylene triamine and menthane diamine, and aromatic amine-based catalysts such as diaminodiphenyl sulfone.

An organic phosphorus-based compound having three organic groups is available as a phosphorus-based catalyst. Examples of such a compound are dicyclohexylphenylphosphine, tri-o-tolylphosphine, tri-m-tolylphosphine, tri-p-tolylphosphine, cyclohexyldiphenylphosphine, triphenylphosphine, triphenylphosphine-triphenylborane complex, and tetraphenylphosphonium-tetraphenylborate. Among these phosphorus-based catalysts, dicyclohexylphenylphosphine, tri-o-tolylphosphine, tri-p-tolylphosphine, and, triphenylphosphine-triphenylborane complex are preferred.

The usage amount of such a polymerization catalyst is usually 1 to 10 parts by weight, preferably 4 to 6 parts by weight, relative to 100 parts by weight of the first bifunctional compound of the in-situ polymerized type thermoplastic epoxy resin 3, from the viewpoint of adhesion, bonding strength, and remelting properties.

In the present invention, a reaction retardant can also be used. In the step of mixing two liquids and impregnation into reinforcing fibers, a resin is often heated because of the necessity to homogeneously liquefy the resin and to reduce the viscosity of the resin as low as possible. For this reason, there is a possibility that a polymerization reaction is initiated before the impregnation of the resin into the reinforcing fibers is completed, so that the viscosity of the resin is increased, thereby causing an impregnation failure. In order to prevent such a failure, a reaction retardant which retards a reaction during heating for reducing viscosity but does not hinder a polymerization reaction after the impregnation is preferably used. Examples of such a reaction retardant include trialkyl borates such as tri-n-butyl borate, tri-n-octyl borate, and tri-n-dodecyl borate and triaryl borates such as triphenyl borate. They are used singly or in combination of two or more of them. Among them, tri-n-octyl borate is preferred because it is a liquid at room temperature and hence has excellent miscibility and considerably retards a reaction at 80° C. or less. The usage amount of such a reaction retardant is usually 1 to 10 parts by weight, preferably 4 to 6 parts by weight, relative to 100 parts by weight of the first bifunctional compound of the in-situ polymerized type thermoplastic epoxy resin 3.

As described above, in the uncured in-situ polymerized type thermoplastic epoxy resin according to the present invention, for example, when the first compound is a bifunctional compound having two epoxy groups in one molecule, and the second compound is a bifunctional compound having two phenolic hydroxyl groups in one molecule, the first compound and the second compound can be linearly polymerized by a polyaddition reaction, as exemplified next. Whether the compounds have been linearly polymerized can be determined by checking, for example, the solubility in a solvent and thermal melting properties. Note that the polyaddition product may partially contain a cross-linked structure as long as it does not hinder the objects of the present invention.

[Chemical 3]

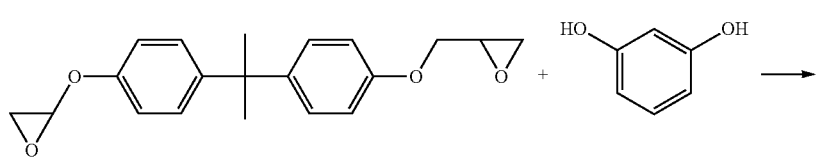

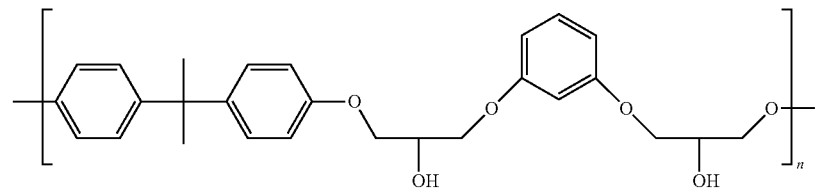

Note that an antifoaming agent, filler, bulking agent, ultraviolet absorbing agent, antioxidizing agent, flame retardant, antibacterial agent, or the like can be added as an additional ingredient to an in-situ polymerized type thermoplastic epoxy resin. Such an additive can be added at a ratio of about 1 to 10 parts by weight relative to 100 parts by weight of the first bifunctional compound.

Reinforcing fibers used in the present invention will be described next. More specifically, reinforcing fibers that can be used include inorganic or organic fibers such as glass fibers, carbon fibers, and aramid fibers. On the other hand, in order to obtain a thermoplastic composite having high mechanical properties by using the in-situ polymerized type thermoplastic prepreg according to the present invention, it is preferable to use reinforcing fibers having a tensile modulus of 40 GPa or more.

Although the shape of reinforcing fibers is not specifically limited, it is possible to use, as reinforcing fibers, unidirectional continuous fibers obtained by paralleling reinforcing fiber bundles (roving) formed by bundling a plurality of single fibers, a fabric having orthogonal anisotropy such as a plain fabric, sateen fabric, twill fabric, or multiaxial insertion fabric, an unwoven fabric, a chopped strand mat, a surfacing mat, or the like. In order to obtain high mechanical properties, in particular, it is preferable to use a fiber sheet shape prepared by paralleling continuous fibers in one direction or a fabric shape.

(Method of Manufacturing In-Situ Polymerized Type Thermoplastic Prepreg)

A method of manufacturing the in-situ polymerized type thermoplastic prepreg 1 according to the present invention will be described next.

The present invention features in that the in-situ polymerized type thermoplastic prepreg 1 is manufactured by a hot melt method, as described above.

Manufacturing Example 1

Manufacturing Example 1 of the method of manufacturing the in-situ polymerized type thermoplastic prepreg 1 according to the present invention will be described with reference to FIGS. 2 to 4.

Figure 2A:
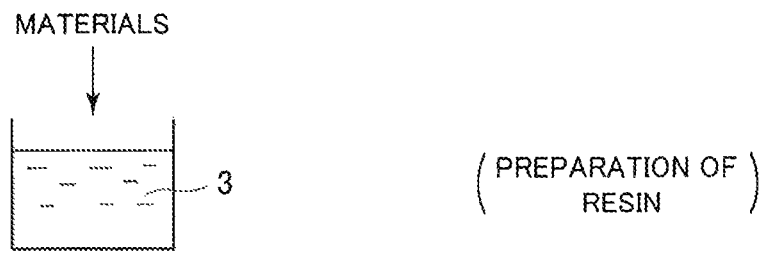
FIGS. 2(a) to 2(d) are process charts for explaining an embodiment of a method of manufacturing an in-situ polymerized type thermoplastic prepreg according to the present invention.
Figure 2B:
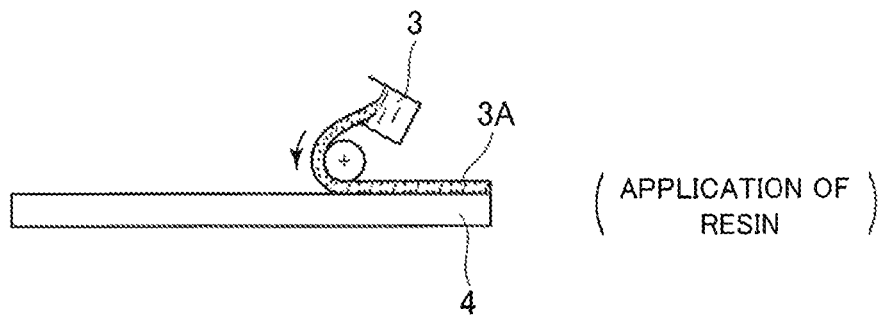
Figure 2C:
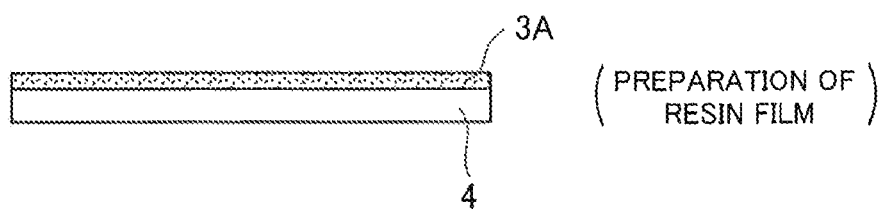

First of all, the in-situ polymerized type thermoplastic epoxy resin 3 is prepared by mixing the first bifunctional compound, the second bifunctional compound, and the catalyst, which have been described above, as materials, and other additives as needed (FIG. 2(a): resin preparation step). At this time, the resin temperature is set to about 20° C. to 80° C. As shown in FIGS. 2(b) and 2(c), the in-situ polymerized uncured thermoplastic epoxy resin 3 is temperature-controlled to a predetermined temperature to have a predetermined viscosity, and is applied in a predetermined amount onto a release sheet such as a silicone release sheet 4 (FIG. 2(b): resin application step) to prepare a uniform resin film 3A having a predetermined resin weight per unit area (FIG. 2(c): resin film preparation step). The resin weight per unit area is changed depending on the resin content ratio of a prepreg to be prepared, and is usually set to 20 g/m² to 150 g/m² in consideration of workability and the like. However, this is not exhaustive.

The in-situ polymerized type thermoplastic epoxy resin 3 used at the time of the preparation of a resin film preferably has a viscosity of 100 Pa·s to 1,000 Pa·s at 25° C. before the start of a curing reaction. If the viscosity is lower than this range, it is difficult to apply the resin to a desired application thickness. i.e., a desired resin weight per unit area. In contrast to this, if the viscosity is too high, it is difficult to adjust the resin to a uniform application thickness by using a metering roll or coating roll.

The resin temperature at the time of the preparation of a resin film is therefore preferably set to 10° C. to 70° C. If the resin temperature is set to less than 10° C. at the time of the preparation of a resin film, it is difficult to uniformly apply the resin onto the release sheet because of high viscosity. If the resin temperature exceeds 70° C. it is difficult to maintain the resin in B-stage because of the promotion of a curing reaction. The resin temperature is especially preferably set to 40° C. to 70° C. Therefore, when using a coating roll, it is preferable to adjust the temperature of the coating roll to 40° C. to 70° C. to adjust the resin temperature to 40° C. to 70° C. so as to facilitate adjusting the application thickness.

Figure 2D:
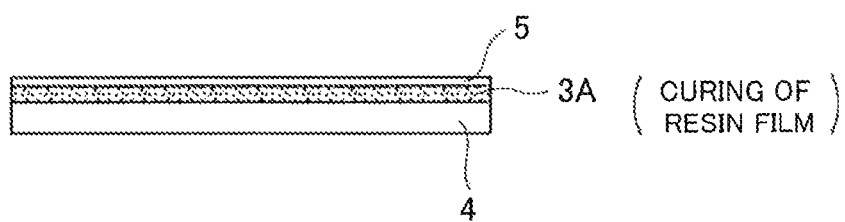

In addition, after a resin film is prepared, as shown in FIG. 2(d), the outer surface of the resin film 3A prepared to have a predetermined resin weight per unit area on the release sheet 4 is covered with a protective film 5 so as to protect the film, and the resin film is cured at a predetermined temperature for a predetermined period until it has appropriate tack properties (FIG. 2(d): resin film curing step). Although the curing temperature and curing period of the resin film 3A are not specifically limited within the range in which the requirement for appropriate tack properties is satisfied, a curing temperature of 20° C. to 40° C. and a curing period of 50 hr to 240 hr under such a temperature atmosphere are preferred. The resin viscosity at this time is 100 Pa·s to 1.000 at 25° C. In this case, the appropriate tack properties are those that allow the resin to be reliably released from the protective film 5 of the prepared resin film 3A and the release sheet 4, and also indicate that the resin in B-stage, with the weight-average molecular weight being 6,000 or less. That is, as shown in FIG. 2(d), the weight-average molecular weight of the resin film 3A having undergone the resin film curing step is 6,000 or less, and is usually set to 300 to 6,000, because the tack properties are too strong with a weight-average molecular weight less than 300, preferably set to 300 to 1.500, and more preferably set to 300 to 500.

In this case, the protective film 5 is a release film bonded on the resin on the resin film 3A.

The curing temperature in the curing step (FIG. 2(d)) after the preparation of the resin film is set to 20° C. to 40° C. for the following reason. If the curing temperature is less than 20° C., the polymerization reaction of the resin is slow, and it takes much time before the resin has appropriate tack properties, resulting in a reduction in productivity. If the curing temperature exceeds 40° C., the viscosity of the resin decreases to change the film thickness of the resin. In addition, as described above, the curing period after the preparation of the resin film is set to 50 hr to 240 hr. If the curing period is too short, such as less than 50 hr. the tack properties of the resin are too strong to completely release the resin from the protective film 5 and the release sheet 4. This make it impossible to use the resin in the prepreg preparation step. If the curing period is too long, such as more than 240 hr. the curing reaction of the resin is promoted to increase the viscosity of the resin. This makes it difficult to perform resin impregnation in the next prepreg preparation step shown in FIGS. 3(a) to 3(c) and FIGS. 4(a) and 4(b).

Figure 3A:
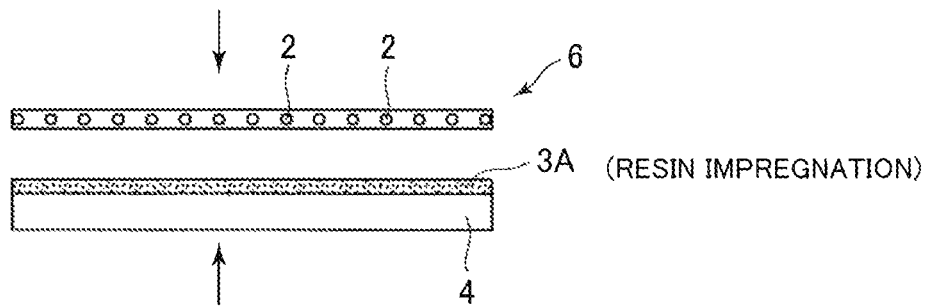
FIGS. 3(a) to 3(c) are process charts for explaining an embodiment of a method of manufacturing an in-situ polymerized type thermoplastic prepreg according to the present invention.
Figure 3B:
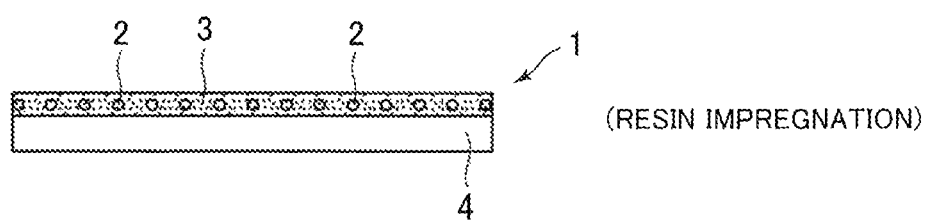

Subsequently, as shown in FIGS. 3(a) and 3(b), the in-situ polymerized type thermoplastic epoxy resin 3 in B-stage is impregnated, as a matrix resin, into the reinforcing fibers 2 in the form of a fiber sheet 6 (FIGS. 3(a) and 3(b): resin impregnation step). In this resin impregnation step, as shown in FIG. 2(d), the protective film 5 is peeled off the outer surface of the resin film 3A uniformly applied onto the silicone release sheet 4 or the like, and the outer surface is brought into contact with one surface (FIG. 3(*a*)) or each of the two surfaces (FIG. 4(*a*)) of the fiber sheet 6 formed from reinforcing fibers paralleled into a sheet. The resultant structure is then heated to a temperature (for example, 100° C. to 130° C.), and a pressurizing force (e.g., 0.1 atm to 5 atm) is applied onto the resultant structure, as needed. Thus, the in-situ polymerized type thermoplastic epoxy resin 3 forming the resin film 3A uniformly applied on the release sheet. 4 or the like is impregnated into the fiber sheet 6 (FIGS. 3(*b*) and 4(*b*)). The surface of the prepreg 1 prepared in this manner is covered with the protective film 5 (FIGS. 3(*c*) and 4(*b*)) or the like, and the prepreg 1 is then stored (FIGS. 3(*c*) and 4(*b*): protective film coating step). The prepreg prepared in this manner is cured to B-stage, with the weight-average molecular weight being 6,000 or less, and has tack properties and drape properties at 30° C. or less (e.g., 20° C. to 30° C.).

In the in-situ polymerized type thermoplastic prepreg 1 according to the present invention, the resin film 3A preferably has a resin weight per unit area that makes the resin content ratio in the prepreg be 20 wt % to 40 wt %. Setting the resin content ratio in the prepreg to 20 wt % or more can prevent the impregnation failure of the in-situ polymerized type thermoplastic epoxy resin 3. This therefore can prevent the occurrence of voids when forming the prepreg 1 into the composite 10. On the other hand, setting the resin content ratio to 40 wt % or less can prevent reductions in impact resistance, tensile strength, and compressive strength due to a reduction in fiber content ratio when forming the prepreg into the composite.

In this case, the resin content ratio of a prepreg is a value expressed in percentage by dividing, by the weight of the prepreg, e.g., a 100 mm×100 mm prepreg, which is measured in advance, the weight of the in-situ polymerized type thermoplastic epoxy resin of the prepreg which is obtained by calculating the difference between the weight of the prepreg and the weight of the reinforcing fibers obtained by dissolving and removing the in-situ polymerized type thermoplastic epoxy resin using an organic solvent and drying the resultant structure at 150° C. for 1 hr.

In addition, in consideration of the handling properties of the prepreg, the weight per unit area of the reinforcing fibers 2 is preferably set to 50 g/m$^2$ to 500 g/m$^2$. If the weight per unit area of the reinforcing fibers 2 is less than 50 g/m$^2$, gaps are formed among the reinforcing fiber bundles, resulting in variations in the physical properties of molded products and a deterioration in appearance quality. On the other hand, if the weight per unit area of the reinforcing fibers 2 exceeds 500 g/m$^2$, it is difficult to impregnate the resin into the reinforcing fibers. Furthermore, this increases the stiffness of the prepreg to lead to a deterioration in drape properties.

The in-situ polymerized type thermoplastic prepreg 1 according to the present invention like that shown in FIGS. 3(*c*) and 4(*b*) prepared in the above manner is preferably stored immediately after the prepreg preparation under an environment of 25° C. or less, preferably −30° C. to 10° C., and more preferably 5° C. or less, in order to maintain the matrix resin 3 in B-stage, with the weight-average molecular weight being 6,000 or less.

Manufacturing Example 2

Manufacturing example 2 of the method of manufacturing the in-situ polymerized type thermoplastic prepreg 1 according to the present invention will be described with reference to FIG. 5.

As in Manufacturing Example 1 described above, in Manufacturing Example 2, first of all, the in-situ polymerized type thermoplastic epoxy resin 3 is prepared by mixing the first bifunctional compound, the second bifunctional compound, and the catalyst, which have been described above, as materials, and other additives as needed (FIG. 5(*a*): resin preparation step). At this time, the resin temperature is set to about 20° C. to 80° C. In Manufacturing Example 2, the in-situ polymerized uncured thermoplastic epoxy resin 3 is cured and the polymerization reaction of the resin is promoted to B-stage, with the weight-average molecular weight being 6000 or less, thus promoting the curing of the resin (FIG. 5(*b*): resin curing step), instead of preparing the uniform resin film 3A by applying the resin on the release sheet 4 or the like as in Manufacturing Example 1. The in-situ polymerized type thermoplastic epoxy resin 3 has a viscosity of 100 Pa·s to 1,000 Pa·s at 25° C. before the start of polymerization.

The in-situ uncured polymerized type thermoplastic epoxy resin 3 prepared by mixing in the resin preparation step (FIG. 5(*a*)) is divided into small amounts and put in a plurality of curing vessels 31, as shown in, for example, FIG. 5(*b*). At this time, the epoxy resin 3 in each vessel may be placed while being covered with the protective film 5 serving as a release film as needed, although not shown. The in-situ polymerized type thermoplastic epoxy resin 3 contained in each vessel 31 is cured at a predetermined temperature for a predetermined period so as to have appropriate tack properties, and the polymerization reaction of the resin is promoted to B-stage, thereby promoting the curing of the resin (FIG. 5(*b*): resin curing step). Although the curing temperature and curing period of the resin 3 are not specifically limited within the range in which the requirement for appropriate tack properties is satisfied, it is preferable to set a curing temperature of 20° C. to 40° C. and a curing period of 50 hr to 240 hr under such a temperature atmosphere in this manufacturing example. The resin viscosity at this time is 100 Pa·s to 1,000 is Pa·s at 25° C.

The curing temperature of the in-situ polymerized type thermoplastic epoxy resin 3 contained in each vessel 31 is set to 20° C. to 40° C. for the following reason. If the curing temperature is less than 20° C. the polymerization reaction of the resin is slow, and it takes much time before the resin has appropriate tack properties, resulting in a reduction in productivity. If the curing temperature exceeds 40° C. the curing process is promoted too much, and the molecular weight increases and exceeds 6000. In addition, as described above, the curing period for the in-situ polymerized type thermoplastic epoxy resin 3 contained in each vessel 31 is set to 50 hr to 240 hr. If the curing period is too short, such as less than 50 hr. the tack properties of the resin are too strong, and it is difficult to extract the resin from the vessel 31 for the next step. If the curing period is too long, such as more than 240 hr, the curing reaction of the resin is promoted to increase the viscosity of the resin. This makes it difficult to uniformly apply the resin in the next resin film preparation step shown in FIGS. 5(*c*) and 5(*d*).

Note that in this manufacturing example, the weight-average molecular weight of the resin having undergone the resin curing step in FIG. 5(*b*) is 6,000 or less, usually 300 to 6,000, preferably 300 to 1,500, and more preferably 300 to 500.

The in-situ polymerized type thermoplastic epoxy resin 3 set in B-stage, with the weight-average molecular weight of the resin being 6,000 or less, in the curing step shown in FIG. 5(*b*) is applied in a predetermined amount onto the release sheet 4 or the like, as shown in FIGS. 5(*c*) and 5(*d*)

Figure 5A:
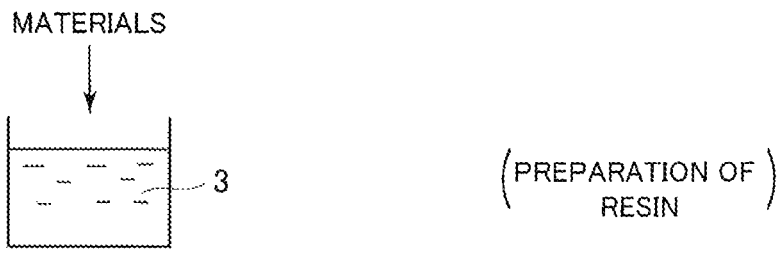
FIGS. 5(a) to 5(e) are process charts for explaining another embodiment of a method of manufacturing an in-situ polymerized type thermoplastic prepreg according to the present invention.
Figure 5B:
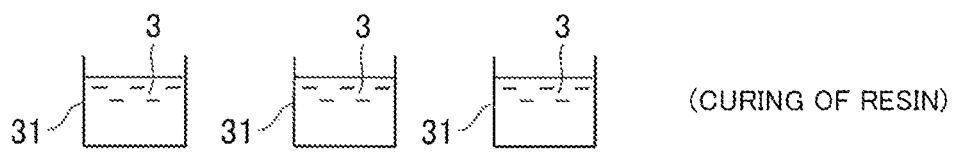
Figure 5C:
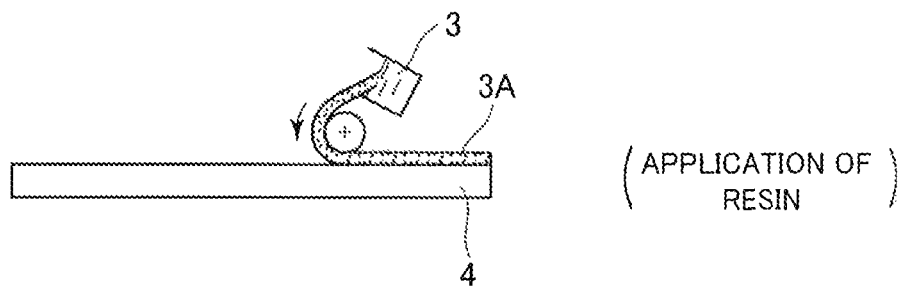
Figure 5D:
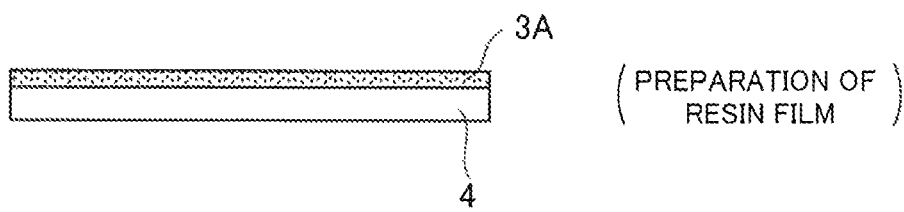

(FIG. 5(c): resin application step) to prepare the uniform resin film 3A having a predetermined resin weight per unit area (FIG. 5(d): resin film preparation step) in the same manner as that described in Manufacturing Example 1.

That is, in Manufacturing Example 2, the in-situ polymerized type thermoplastic epoxy resin 3 set in B-stage is heated while its temperature is adjusted within a predetermined temperature range so as to have a predetermined viscosity and is applied in a predetermined amount onto a release sheet such as the silicone release sheet 4 (FIG. 5(c): resin application step), thereby preparing the uniform resin film 3A having a predetermined resin weight per unit area (FIG. 5(d): resin film preparation step). Although the resin weight per unit area is changed depending on the resin content ratio of a prepared prepreg, the resin weight per unit area is usually set to 20 g/m$^2$ to 150 g/m$^2$ in consideration of workability and the like. However, this is not exhaustive.

The in-situ polymerized type thermoplastic epoxy resin 3 used at the time of the preparation of the resin film shown in FIG. 5(c) has a viscosity of 100 Pa·s to 1,000 Pas at 25° C. as described above. If the viscosity is lower than this range, it is difficult to apply the resin to a desired application thickness, i.e., a desired resin weight per unit area. In contrast to this, if the viscosity is too high, it is difficult to adjust the resin to a uniform application thickness by using a metering roll or coating roll.

The resin temperature at the time of the preparation of a resin film is therefore preferably set to 40° C. to 80° C. If the resin temperature is set to less than 40° C. at the time of the preparation of a resin film, it is difficult to uniformly apply the resin onto the release sheet because of the high viscosity of the resin. If the resin temperature exceeds 80° C., it is difficult to maintain the resin in B-stage because of the promotion of a curing reaction. The resin temperature is especially preferably set to 60° C. to 80° C. Therefore, when using a coating roll, it is preferable to adjust the temperature of the coating roll to 60° C. to 80° C. to adjust the resin temperature to 60° C. to 80° C. so as to facilitate adjusting the application thickness.

Figure 5E:
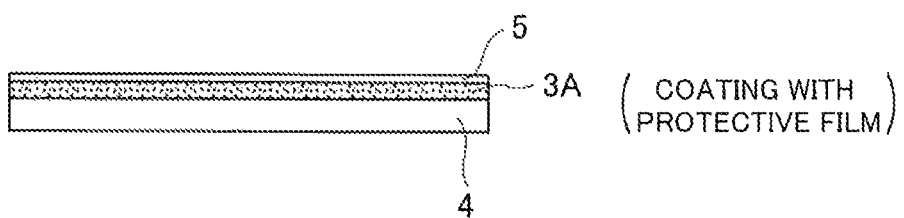

In addition, after a resin film is prepared, as shown in FIG. 5(e), the outer surface of the resin film 3A prepared to have a predetermined resin weight per unit area on the release sheet 4 is covered with the protective film 5 serving as the above release film so as to protect the film.

The prepreg 1 is prepared in the same manner as that described in Manufacturing Example 1 by using the resin film 3A prepared in this manner. That is, as shown in FIGS. 3(a) and 3(b), the in-situ polymerized type thermoplastic epoxy resin 3 in B-stage is impregnated, as a matrix resin, into the reinforcing fibers 2 in the form of the fiber sheet 6. In this resin impregnation step, the protective film 5 is peeled off the outer surface of the resin film 3A uniformly applied onto the silicone release sheet 4 or the like, and the outer surface is brought into contact with one surface (FIG. 3(a)) or each of the two surfaces (FIG. 4(a)) of the fiber sheet 6 formed from reinforcing fibers paralleled into a sheet. The resultant structure is then heated to a temperature (for example, 100° C. to 130° C.), as needed, and a pressurizing force (e.g., 0.1 atm to 5 atm) is applied onto the resultant structure, as needed. Thus, the in-situ polymerized type thermoplastic epoxy resin 3 forming the resin film 3A uniformly applied on the release sheet 4 or the like is impregnated into the fiber sheet 6 (FIGS. 3(b) and 4(b)). The surface of the prepreg 1 prepared in this manner is covered with the protective film 5 (FIGS. 3(c) and 4(b)) or the like, and the prepreg 1 is then stored (FIGS. 3(c) and 4(b): protective film coating step). The prepreg prepared in this manner is cured to B-stage, with the weight-average molecular weight being 6,000 or less, and has tack properties and drape properties at 30° C. or less. e.g., 20° C. to 30° C.

In the in-situ polymerized type thermoplastic prepreg 1 according to the present invention, the resin film 3A preferably has a resin weight per unit area that makes the resin content ratio in the prepreg be 20 wt % to 40 wt %. Setting the resin content ratio in the prepreg to 20 wt % or more can prevent the impregnation failure of the in-situ polymerized type thermoplastic epoxy resin 3. This therefore can prevent the occurrence of voids when forming the prepreg 1 into the composite 10. On the other hand, setting the resin content ratio to 40 wt % or less can prevent reductions in impact resistance, tensile strength, and compressive strength due to a reduction in fiber content ratio when forming the prepreg into the composite.

In this case, as described above, the resin content ratio of a prepreg is a value expressed in percentage by dividing, by the weight of the prepreg, e.g., a 100 mm×100 mm prepreg, which is measured in advance, the weight of the in-situ polymerized type thermoplastic epoxy resin of the prepreg which is obtained by calculating the difference between the weight of the prepreg and the weight of the reinforcing fibers obtained by dissolving and removing the in-situ polymerized type thermoplastic epoxy resin using an organic solvent and drying the resultant structure at 150° C. for 1 hr.

In addition, in consideration of the handling properties of the prepreg, the weight per unit area of the reinforcing fibers 2 is preferably set to 50 g/m$^2$ to 500 g/m$^2$. If the weight per unit area of the reinforcing fibers 2 is less than 50 g/m$^2$, gaps are formed among the reinforcing fiber bundles, resulting in variations in the physical properties of molded products and a deterioration in appearance quality. On the other hand, if the weight per unit area of the reinforcing fibers 2 exceeds 500 g/m$^2$, it is difficult to impregnate the resin into the reinforcing fibers. Furthermore, this increases the stiffness of the prepreg to lead to a deterioration in drape properties.

Figure 3C:
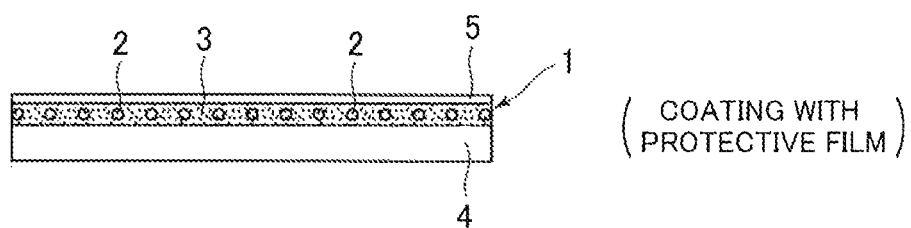
Figure 4A:
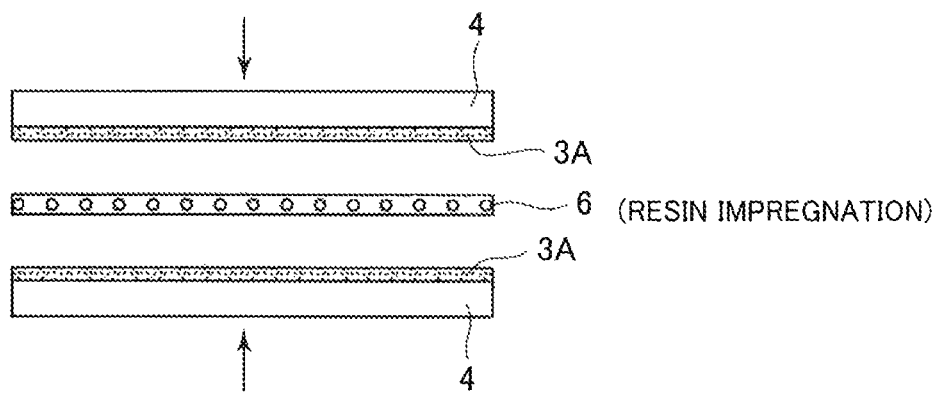
FIGS. 4(a) and 4(b) are process charts for explaining another embodiment of a method of manufacturing an in-situ polymerized type thermoplastic prepreg according to the present invention.
Figure 4B:
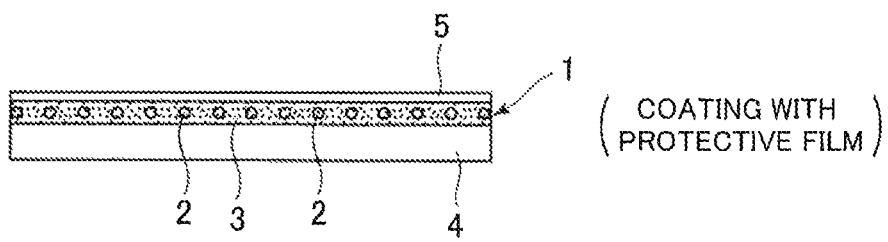

The in-situ polymerized type thermoplastic prepreg 1 according to the present invention like that shown in FIGS. 3(c) and 4(b) prepared in the above manner is preferably stored immediately after the prepreg preparation under an environment of 25° C. or less, preferably −30° C. to 10° C., and more preferably 5° C. or less, in order to maintain the matrix resin 3 in B-stage, with the weight-average molecular weight being 6,000 or less.

(Method of Manufacturing Thermoplastic Composite)

A method of manufacturing a thermoplastic composite according to the present invention will be described next.

Figure 3D:
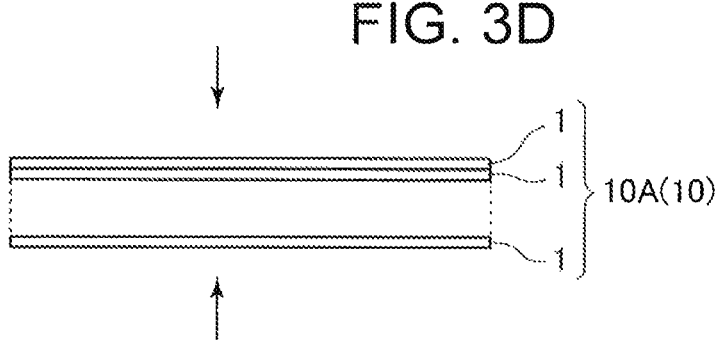
FIG. 3(d) is a view for explaining an embodiment of a method of manufacturing a thermoplastic composite according to the present invention.

As shown in FIGS. 1(b) and 3(d), a plurality of prepregs, each identical to the in-situ polymerized type thermoplastic prepregs 1 according to the present invention, are laminated on each other, and the laminated body 10A is heated and molded in an oven, thereby obtaining the thermoplastic composite 10. In this case, the outside of the composite may be pressurized and the inside of the composite may be degassed and evacuated, as needed. The composite is heated and pressurized at a heating temperature of 100° C. to 200° C. and a pressurizing force of 1 atm to 10 atm, usually at a heating temperature of 140° C. to 160° C. and a pressurizing force of 1 atm to 5 atm. In addition, the composite needs to be held under these heating and pressurizing conditions for 60 min to 180 min. If the holding time is less than 60 min, the molecular weight cannot be sufficiently increased to cause a deterioration in mechanical properties. If the holding time exceeds 180 min, a problem does not occur in terms of performance but occurs in terms of productivity. Specific methods of heating and pressurizing the composite include a press molding method, autoclave molding method, vacuum molding method, wrapping tape method, and internal pressure molding method. In particular, the autoclave method is preferably used.

The weight-average molecular weight of the in-situ polymerized type thermoplastic epoxy resin 3 in the thermoplastic composite 10 after heating and curing is set to 30,000 or more, and usually 150,000 or less. If the weight-average molecular weight is less than 30,000, the strength of the resin does not sufficiently develops.

The thermoplastic composite 10 molded by using the in-situ polymerized type thermoplastic prepreg 1 according to the present invention is excellent in strength, rigidity, impact resistance, and secondary workability, and hence is widely used for aerospace applications, general industrial application, and the like. More specifically, in aerospace applications, such composites are favorably used as aircraft primary structural materials for main wings, tail wings, fuselages, floor beams, and the like, aircraft secondary structural materials for flaps, ailerons, cowls, fairings, interior trims, and the like, materials for rocket motor cases, structural materials for artificial satellites, and the like. In general industrial applications, the composites are favorably used as structural materials for moving bodies such as vehicles, ships, and railway carriages, drive shafts, leaf springs, wind turbine blades, pressure vessels, fly-wheels, papermaking rollers, roof materials, cables, reinforcing bars, computer-related materials for IC trays, the housings of notebook personal computers, tablets, and smartphones, and the like, and civil engineering and building materials such as repairing and reinforcing materials. Among them, the thermoplastic composite according to the present invention is especially favorably used for vehicle members, ship members, wind turbine blades, and IC trays and the housings of notebook personal computers, tablets, and smartphones.

Examples 1 to 10 of the in-situ polymerized type thermoplastic prepreg 1 and the thermoplastic composite (laminated plate) 10 according to the present invention will be described in more detail in comparison with Comparative Examples 1 to 5. Tables 1 to 3 given below show the evaluation results obtained from the respective examples and comparative examples. Although the in-situ polymerized type thermoplastic epoxy resins and reinforcing fibers used in Examples 1 to 10 and Comparative Examples 1 to 5 are described below, it is obvious that the present invention is not limited to these examples and comparative examples.

<In-Situ Polymerized Type Thermoplastic Epoxy Resin>

An in-situ polymerized type thermoplastic epoxy resin was prepared by mixing the following materials in the following mixing ratio (parts by weight):

first bifunctional compound . . . 100 parts by weight:
bisphenol A-type liquid epoxy resin (available from Asahi Kasei Chemicals Corporation: commercial name "AER260")

second bifunctional compound . . . 60 parts by weight
bisphenol A (available from Mitsui Chemicals Inc.: commercial name "BPA-M")

catalyst . . . 4 parts by weight
tri-o-tolylphosphine (available from Hokko Chemical Industry Co., ltd.: commercial name "TOTP")

reaction retardant . . . 4 parts by weight
tri-n-octyl borate (available from Tokyo Chemical Industry Co., Ltd.)

The mixture obtained in this manner, i.e., the in-situ uncured polymerized type thermoplastic epoxy resin, did not undergo a polymerization reaction during storage at room temperature (20° C. to 30° C.), although the temperature at the time of preparation was 20° C. to 40° C.

<Reinforcing Fibers>

Carbon fibers were used as reinforcing fibers. As carbon fibers, a carbon fiber bundle (available from Toray Industries, Inc.: commercial name "ToraycaT700SC-12000") (number of single fibers: 12,000, tensile strength: 4.9 GPa, tensile modulus: 230 GPa, and tensile elongation: 2.1%) was used.

In-situ polymerized type thermoplastic prepregs in each example and each comparative example were manufactured in the following manner according to the manufacturing method described in Manufacturing Example 1 described above.

Examples 1 to 10 and Comparative Examples 1 to 5

<Preparation of Resin Film>

An in-situ polymerized type thermoplastic epoxy resin 3 obtained by kneading the first bifunctional compound (bisphenol A-type liquid epoxy resin), the second bifunctional compound (bisphenol A), the catalyst (tri-o-tolylphosphine), and the reaction retardant (tri-n-octyl borate), which were described above, was uniformly applied onto a release sheet 4 coated with silicone by using a reverse roll coater type resin coating apparatus to form a resin film 3A having a width of 1 m and a length of 100 m. The viscosity of the in-situ polymerized type thermoplastic epoxy resin 3 before polymerization was 200 Pa·s at 25° C.

Tables 1 to 3 show resin temperatures and coating roll temperatures. The resin was uniformly applied onto the release sheet such that the resin weight per unit area of the resin film 3A became 35 g/m$^2$. In addition, the prepared resin film 3A was cured under the conditions written in Tables 1 to 3, thus obtaining the resin film 3A suitable for the preparation of a prepreg. The viscosity of the resin in the resin film 3A was 600 Pa·s at 25° C.

<Preparation of Prepreg>

As shown in FIG. 4, an in-situ polymerized type thermoplastic prepreg 1, with the in-situ polymerized type thermoplastic epoxy resin 3 being impregnated into the carbon fibers, was obtained by making the resin films 3A, prepared in the above manner, sandwich a sheet 6, from its two surfaces, which was obtained by uniformly paralleling carbon fibers in uni-directional into continuous fibers, and heating and pressuring the resultant structure by using a press roll. The weight per unit area of the carbon fibers in the in-situ polymerized type thermoplastic prepreg 1 was 80 g/m$^2$. The form in which reinforcing fibers are paralleled in one direction is called UD (Uni-direction).

In order to adjust the viscosity of the in-situ polymerized type thermoplastic epoxy resins 3 at the time of impregnation, the temperature of the press roll was set to 100° C., 120° C., and 130° C. as indicated by Tables 1 to 3, and the pressurizing force of the press roll was set to 10 atm. Under these conditions, the in-situ polymerized type thermoplastic prepregs 1 were prepared, each of which had a fiber weight per unit area of 80 g/m$^2$ and a resin content ratio of 30 wt %. Tables 1 to 3 show the evaluation results of tack properties and drape properties. The UD prepregs prepared in this manner were immediately stored under the storage conditions written in Tables 1 to 3.

<Molding of Laminated Plate>

The stored prepregs 1 were taken out, and their temperatures were restored to room temperature. The prepregs were then laminated on each other, as shown in FIG. 1(*b*). A laminated body 10A was formed by laminating 10 layers so as to orient all the reinforcing fibers in one direction. The laminated body was subjected to autoclave molding to form a laminated plate 10 as a thermoplastic composite. The autoclave molding was performed at a temperature of 140° C. and a pressurizing condition of 4 atm for a holding time written in Tables 1 to 3, thereby molding the laminated plate.

<Physical Properties of Laminated Plate>

The obtained laminated plate 10 was subjected to a bend test complying with JIS K7074 to obtain the bending strength and bending elastic modulus of the sample in each of the examples and the comparative examples. Tables 1 to 3 show the test results.

<Weight-Average Molecular Weight>

The weight-average molecular weight of a matrix resin was measured in each step for a resin film, prepreg, and laminated plate. Each weight-average molecular weight was measured by a GPC method (Gel Permeation Chromatography). Tables 1 to 3 show the measurement results. Note that the in-situ polymerized type thermoplastic epoxy resins of the laminated plates obtained in each of the examples and the comparative examples had a glass-transition point of 95° C. and a melting point of 150° C.

The following are methods of evaluating resin films and prepregs in the above examples and the above comparative examples.

<Resin Film Tack Properties>

A protective film was peeled off at 23° C. and 50% RH, and the tack properties of the protective film was determined by the adhesion amount of resin left in the protective film and tactile sensation. The following are the signs representing the meanings of the evaluation results of resin film tack properties written in Tables 1 to 3:

o: state in which protective film has appropriate adhesion and hence resin does not adhere to protective film Δ: state in which protective film has very strong adhesion and hence resin partly adheres to protective film x: state in which protective film is in liquid form and has high adhesion and hence resin adheres to entire surface of protective film <Drape Properties of Prepreg>

The drape properties of each prepreg at 23° C. and 50% RH were determined by flexibility. The following are the signs representing the meanings of the evaluation results of the drape properties written in Tables 1 to 3:

o: prepreg is flexible and hence fibers do not break even when being shaped in mold having complex shape Δ: prepreg is slightly less flexible than when being in state of "o" but fibers do not break even when being shaped in mold having complex shape x: prepreg is rigid and hence fibers break when being shaped in mold having complex shape <Tack Properties of Prepreg>

The tack properties of each prepreg were determined by the bonded state of a laminated body obtained by lightly pressing and bonding prepregs to each other with a roller at 23° C. and 50% RH. The following are the signs representing the meanings of the evaluation results of the tack properties written in Tables 1 to 3:

o: hard to come off

Δ: slightly less hard to come off than in state of "o" but tolerable x: easy to come off <Comprehensive Determination>

The evaluations of obtained resin films, prepregs, and laminate plates were comprehensively determined. The following are the signs representing the meanings of the comprehensive evaluation results written in Tables 1 to 3:

o: Both the tack properties and drape properties are good; optimal in-situ polymerized type thermoplastic prepreg and laminated plate Δ: although prepreg and laminated plate can be prepared, required performance is not achieved in terms of either tack properties or drape properties x: defects are recognized in prepreg and laminated plate

TABLE 1

| Step | Item | Unit | Example 1 | Example 2 | Example 3 | Example 4 | Example 5 | Example 6 |
|---|---|---|---|---|---|---|---|---|
| Resin Film | In-situ polymerized type thermoplastic epoxy resin compounding ratio (ratio by weight) | AER260 | 100 | 100 | 100 | 100 | 100 | 100 |
| | | BPA-M | 600 | 60 | 60 | 60 | 60 | 60 |
| | | TOTP | 4 | 4 | 4 | 4 | 4 | 4 |
| | | Tri-n-octyl borate | 4 | 4 | 4 | 4 | 4 | 4 |
| | Resin temperature | ° C. | 25 | 25 | 25 | 25 | 25 | 25 |
| | Coating roll temperature | ° C. | 40 | 40 | 40 | 40 | 40 | 40 |
| | Resin weight per unit area | g/m2 | 35 | 35 | 35 | 35 | 35 | 35 |
| | Curing temperature | ° C. | 25 | 25 | 25 | 25 | 25 | 25 |
| | Curing period | Time | 240 | 240 | 240 | 50 | 240 | 240 |
| | Resin film tack properties | — | o | o | o | o | o | o |
| | Weight-average molecular weight | MW | 500 | 500 | 500 | 300 | 500 | 500 |
| Prepreg | Reinforcing fibers | — | T700SC-12K | T700SC-12K | T700SC-12K | T700SG-12K | T700SC-12K | T700SC-12K |
| | Reinforcing fiber form | — | UD | UD | UD | UD | UD | UD |
| | Reinforcing fiber weight par unit area | g/m2 | 80 | 80 | 80 | 80 | 80 | 80 |
| | Press roll temperature | ° C. | 100 | 100 | 130 | 100 | 100 | 100 |
| | Storage condition | ° C. × time | −10 × 24 | −10 × 720 | −10 × 720 | −10 × 720 | 25 × 200 | −10 × 720 |
| | Prepreg drape properties | — | o | o | o | o | Δ | o |
| | Prepreg tack properties | — | o | o | o | o | Δ | o |
| | Weight-average molecular weight | MW | 600 | 720 | 1500 | 400 | 5800 | 700 |
| Laminated Plate | Molding temperature | ° C. | 140 | 140 | 140 | 140 | 140 | 140 |
| | Molding pressure | atm | 4 | 4 | 4 | 4 | 4 | 4 |
| | Temperature/pressure holding time | Min. | 30 | 90 | 90 | 90 | 90 | 130 |
| | Weight-average molecular weight | MW | 45000 | 46000 | 52000 | 30000 | 55000 | 125000 |
| | Bending strength | MPa | 1300 | 1900 | 1850 | 1880 | 1910 | 1880 |
| | Banding elastic modules | GPa | 135 | 133 | 134 | 130 | 133 | 132 |
| | Comprehensive determination | — | o | o | o | o | o | o |

TABLE 2

| Step | Item | Unit | Example 7 | Example 8 | Example 9 | Example 10 |
|---|---|---|---|---|---|---|
| Resin Film | In-situ polymerized type thermoplastic epoxy resin compounding ratio (ratio by weight) | AER260 | 100 | 100 | 100 | 100 |
| | | 8PA-M | 60 | 60 | 60 | 60 |
| | | TOTP | 4 | 4 | 4 | 4 |
| | | TH-n-octyl borate | 4 | 4 | 4 | 4 |
| | Resin temperature | ° C. | 25 | 25 | 25 | 25 |
| | Coating roll temperature | ° C. | 40 | 40 | 40 | 40 |
| | Resin weight per unit area | g/m2 | 35 | 35 | 35 | 35 |
| | Curing temperature | ° C. | 40 | 40 | 40 | 40 |
| | Curing period | Time | 100 | 100 | 70 | 50 |
| | Resin film tack properties | — | ○ | ○ | ○ | ○ |
| | Weight-average molecular weight | MW | 960 | 1000 | 700 | 500 |
| Prepreg | Reinforcing fibers | — | T700SC-12K | T700SC-12K | T700SC-12K | T700SC-12K |
| | Reinforcing fiber form | — | UD | UD | UD | UD |
| | Reinforcing fiber weight par unit area | g/m2 | 80 | 80 | 80 | 80 |
| | Press roll temperature | ° C. | 130 | 130 | 120 | 100 |
| | Storage condition | ° C. × time | −10 × 24 | −10 × 720 | 25 × 120 | −10 × 720 |
| | Prepreg drape properties | — | Δ | Δ | Δ | ○ |
| | Prepreg tack properties | — | Δ | Δ | Δ | ○ |
| | Weight-average molecular weight | MW | 5900 | 6000 | 5800 | 1000 |
| Laminated Plate | Molding temperature | ° C. | 140 | 140 | 140 | 140 |
| | Molding pressure | atm | 4 | 4 | 4 | 4 |
| | Temperature/pressure holding time | Min. | 90 | 90 | 90 | 90 |
| | Weight-average molecular weight | MW | 56000 | 64000 | 60000 | 55000 |
| | Sending strength | MPa | 1900 | 1900 | 1880 | 1910 |
| | Sending elastic modules | GPa | 135 | 133 | 130 | 133 |
| | Comprehensive determination | — | ○ | ○ | ○ | ○ |

TABLE 3

| Step | Item | Unit | Comparative Example 1 | Comparative Example 2 | Comparative Example 3 | Comparative Example 4 | Comparative Example 5 |
|---|---|---|---|---|---|---|---|
| Resin Film | In-situ polymerized type thermoplastic epoxy resin compounding ratio (ratio by weight) | AER260 | 100 | 100 | 100 | 100 | 100 |
| | | BPA-M | 60 | 60 | 60 | 60 | 60 |
| | | TOTP | 4 | 4 | 4 | 4 | 4 |
| | | Tri-n-octyl borate | 4 | 4 | 4 | 4 | 4 |
| | Resin temperature | ° C. | 40 | 25 | 25 | 25 | 25 |
| | Coating roll temperature | ° C. | 80 | 40 | 80 | 40 | 40 |
| | Resin weight per unit area | g/m2 | 35 | 35 | 35 | 35 | 35 |
| | Curing temperature | ° C. | 25 | 50 | 55 | 25 | 25 |
| | Curing period | Time | 30 | 120 | 240 | 240 | 240 |
| | Resin film tack properties | — | x | Δ | x | ○ | ○ |
| | Weight-average molecular weight. | MW | 200 | 1600 | 7000 | 500 | 500 |
| Prepreg | Reinforcing fibers | — | Incapable of peeling protective film | T700SC-12K | Incapable of impregnating resin | T700SC-12K | T700SC-12K |
| | Reinforcing fiber form | — | | UD | | UD | UD |
| | Reinforcing fiber weight par unit area | g/m2 | | 80 | | 80 | 80 |
| | Press roll temperature | ° C. | | 140 | | 150 | 100 |
| | Storage condition | ° C. × time | | −10 × 24 | | −10 × 720 | −10 × 720 |
| | Prepreg drape properties | — | | x | | x | ○ |
| | Prepreg tack properties | — | | x | | x | ○ |
| | Weight-average molecular weight | MW | | 6500 | | 6200 | 720 |
| Laminated Plate | Molding temperature | ° C. | | 140 | | 140 | 140 |
| | Molding pressure | atm | | 4 | | 4 | 4 |
| | Temperature/pressure holding time | Min. | | 90 | | 90 | 30 |
| | Weight-average molecular weight | MW | | 50000 | | 55000 | 25000 |
| | Bending strength | MPa | | 1820 | | 1900 | 1500 |
| | Bending elastic modules | GPa | | 130 | | 133 | 115 |
| | Comprehensive determination | — | x | Δ | x | Δ | x |

Evaluations of Examples and Comparative Examples

Examples 1 to 10 indicate that each in-situ polymerized type thermoplastic prepreg formed according to the present invention is
(a) an in-situ polymerized type thermoplastic prepreg including reinforcing fibers and an in-situ polymerized type thermoplastic epoxy resin as a matrix resin,
(b) with the in-situ polymerized type thermoplastic epoxy resin being cured to B-stage, with the weight-average molecular weight being 6,000 or less, having tack properties and drape properties at 30° C. or less; and
(c) with the in-situ polymerized type thermoplastic epoxy resin after curing having a weight-average molecular weight of 30,000 or more and exhibiting thermoplasticity.

That is, each in-situ polymerized type thermoplastic prepreg according to the present invention loses tack properties and drape properties when the weight-average molecular weight exceeds 6,000 (Example 8 and Comparative Example 4). When the weight-average molecular weight of an in-situ polymerized type thermoplastic epoxy resin is less than 300, the tack properties are too strong to peel a protective film covering the in-situ polymerized type thermoplastic epoxy resin formed into a resin film (Example 4 and Comparative Example 1). For this reason, the weight-average molecular weight of a resin film having undergone a curing step is set to 6,000 or less, preferably 300 to 1,500, and more preferably 300 to 500 (Examples 1 to 10 and Comparative Examples 1 to 3). In the present invention, the weight-average molecular weight of an in-situ polymerized type thermoplastic epoxy resin in B-stage is set to 400 to 6,000, and preferably 600 to 1,500 (Examples 1 to 10 and Comparative Example 4).

The weight-average molecular weight of the in-situ polymerized type thermoplastic epoxy resin 3 in the thermoplastic composite 10 after heating and curing is set to 30,000 or more, and generally 150,000 or less (Examples 1 to 10). If the weight-average molecular weight is less than 30,000, the strength of the resin does not sufficiently develops (Comparative Example 5).

As is obvious from the Examples and the Comparative Examples described above, an in-situ polymerized type thermoplastic prepreg obtained by the present invention is excellent in tack properties and drape properties and exhibits excellent mechanical properties at a room temperature of 30° C. or less, i.e., 20° C. to 30° C. Such features cannot be obtained by conventional known techniques. An in-situ polymerized type thermoplastic prepreg according to the present invention can be widely used for aerospace applications, general industrial application, and the like, for which conventional thermoplastic prepregs have been difficult to use. Among them, a thermoplastic composite obtained by using the in-situ polymerized type thermoplastic prepreg according to the present invention is especially favorably used for vehicle members and the housings of IC trays, notebook personal computers, tablets, and smartphones, where high productivity is required.

Other Examples and Comparative Examples

Examples 1 to 10 and Comparative Examples 1 to 5 described above each used the in-situ polymerized type thermoplastic epoxy resin obtained by mixing the first bifunctional compound (bisphenol A-type liquid epoxy resin), the second bifunctional compound (bisphenol A), the catalyst (tri-o-tolylphosphine), and the reaction retardant (tri-n-octyl borate) as materials. Similar experiments were conducted by using an in-situ polymerized type thermoplastic epoxy resin which differed from the above resin only in that it included no reaction retardant. It was able to obtain results similar to those in Examples 1 to 10 and Comparative Examples 1 to 5 shown in Tables 1 to 3.

DESCRIPTION OF REFERENCE NUMERALS 1 in-situ polymerized type thermoplastic prepreg
2 reinforcing fibers
3 in-situ polymerized type thermoplastic epoxy resin
3A in-situ polymerized type thermoplastic epoxy resin film
10 thermoplastic composite
10A in-situ polymerized type thermoplastic prepreg laminated body

The invention claimed is:
1. A method of manufacturing an in-situ polymerized type thermoplastic prepreg comprising reinforcing fibers and a partially polymerized thermoplastic epoxy resin as a matrix resin, the method comprising:
(a) preparing a precursor composition of the partially polymerized thermoplastic epoxy resin comprising a first bifunctional compound having two epoxy groups, a second bifunctional compound having two functional groups of at least one type selected from the group consisting of a phenolic hydroxyl group, an amino group, a carboxyl group, a mercapto group, an isocyanate group, and a cyanate ester group, and a catalyst;
(b) preparing a resin film by uniformly applying the precursor composition onto a release sheet while adjusting a temperature of the precursor composition within a range of 40° C. to 70° C.;
(c) performing a partial polymerization reaction of the resin film on the release sheet, with a weight-average molecular weight of the partially polymerized thermoplastic epoxy resin being not more than 6,000, while maintaining a temperature of the resin film at 20° C. to 40° C. for 50 hr to 240 hr; and
(d) impregnating the partially polymerized thermoplastic epoxy resin as a matrix resin into the reinforcing fibers.
2. The method of manufacturing an in-situ polymerized type thermoplastic prepreg according to claim 1, wherein the catalyst is selected from imidazole-based catalysts, aliphatic polyamine-based catalysts, aromatic amine-based catalysts, and phosphorus-based catalysts.
3. The method of manufacturing an in-situ polymerized type thermoplastic prepreg according to claim 1, wherein the precursor composition has a viscosity of 100 Pa·s to 1,000 Pa·s at 25° C. before polymerization.
4. The method of manufacturing an in-situ polymerized type thermoplastic prepreg according to claim 1, wherein the in-situ polymerized type thermoplastic prepreg has a resin content ratio of 20 wt % to 40 wt %.
5. The method of manufacturing an in-situ polymerized type thermoplastic prepreg according to claim 1, wherein the reinforcing fibers have a weight per unit area of 50 $g/m^2$ to 500 $g/m^2$.
6. The method of manufacturing an in-situ polymerized type thermoplastic prepreg according to claim 1, wherein the reinforcing fibers comprise uni-directional continuous fibers having a tensile modulus of not less than 40 GPa and paralleled in one direction.

7. A method of manufacturing a thermoplastic composite, the method comprising:
   manufacturing an in-situ polymerized type thermoplastic prepreg by performing the method according to claim 1; and
   further polymerizing the matrix resin until the matrix resin has a weight-average molecular weight of not less than 30,000, thereby forming a thermoplastic composite.

* * * * *